US012720657B2

(12) United States Patent
Maes et al.

(10) Patent No.: US 12,720,657 B2
(45) Date of Patent: Aug. 25, 2026

(54) CONTROLLER FOR CONTROLLING A PLURALITY OF LIGHTING UNITS IN A SPACE AND A METHOD THEREOF

(71) Applicant: SIGNIFY HOLDING B.V., Eindhoven (NL)

(72) Inventors: Jérôme Eduard Maes, Eindhoven (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 84 days.

(21) Appl. No.: 18/871,249

(22) PCT Filed: May 23, 2023

(86) PCT No.: PCT/EP2023/063783

§ 371 (c)(1),
(2) Date: Dec. 3, 2024

(87) PCT Pub. No.: WO2023/232558

PCT Pub. Date: Dec. 7, 2023

(65) Prior Publication Data

US 2025/0358917 A1 Nov. 20, 2025

(30) Foreign Application Priority Data

Jun. 3, 2022 (EP) ..................................... 22177123

(51) Int. Cl.
*H05B 47/105* (2020.01)
*H05B 47/155* (2020.01)
*H05B 47/175* (2020.01)

(52) U.S. Cl.
CPC ......... *H05B 47/105* (2020.01); *H05B 47/155* (2020.01); *H05B 47/196* (2024.01); *H05B 47/1965* (2024.01)

(58) Field of Classification Search
None
See application file for complete search history.

(56) References Cited

U.S. PATENT DOCUMENTS 9,006,996 B2 * 4/2015 Mohan .................. H05B 47/11 315/307
9,717,125 B2 * 7/2017 Carrigan ................ H05B 45/22
9,723,696 B2 * 8/2017 Carrigan ................ H05B 45/22
(Continued)

FOREIGN PATENT DOCUMENTS

WO 2018069154 A1 4/2018
WO WO-2021156165 A1 * 8/2021 ........... H05B 47/155
WO WO-2023232558 A1 * 12/2023 ........... H05B 47/196

*Primary Examiner* — Srinivas Sathiraju

(57) ABSTRACT

A method of controlling a plurality of lighting units located in a space according to a light scene comprising a plurality of light settings is disclosed. The method comprises obtaining location information indicative of a location of a camera in the space relative to the plurality of lighting units, mapping the plurality of light settings onto the plurality of lighting units, wherein each light setting is mapped onto a lighting unit based on the light setting's respective color, saturation, intensity and/or temporal aspects and based on the lighting unit's respective location relative to the location of the camera, and controlling the plurality of lighting units according to the mapped light settings.

13 Claims, 4 Drawing Sheets

100

(56) References Cited

U.S. PATENT DOCUMENTS

| | | | | |
|---|---|---|---|---|
| 9,900,957 | B2 * | 2/2018 | van de Ven | F21V 7/00 |
| 10,471,231 | B2 * | 11/2019 | Moore-Ede | H05B 47/19 |
| 10,819,824 | B2 * | 10/2020 | Lebel | H05B 45/28 |
| 11,071,182 | B2 * | 7/2021 | Cremer | H05B 47/165 |
| 11,234,312 | B2 * | 1/2022 | Meerbeek | H05B 47/175 |
| 11,470,700 | B2 * | 10/2022 | Cremer | H05B 45/20 |
| 11,528,795 | B2 * | 12/2022 | Herf | H05B 47/16 |
| 11,800,613 | B2 * | 10/2023 | van de Ven | F21V 5/04 |
| 12,133,307 | B2 * | 10/2024 | Baker | G06F 3/0482 |
| 2005/0275626 | A1 * | 12/2005 | Mueller | H05B 47/125 345/156 |
| 2010/0244708 | A1 | 9/2010 | Cheung et al. | |
| 2014/0112537 | A1 * | 4/2014 | Frank | G01N 21/17 315/149 |
| 2015/0008831 | A1 * | 1/2015 | Carrigan | H05B 45/22 315/153 |
| 2015/0123546 | A1 * | 5/2015 | Pandharipande | H05B 47/175 315/153 |
| 2016/0088707 | A1 * | 3/2016 | Van De Sluis | G06F 1/1694 315/297 |
| 2016/0092198 | A1 * | 3/2016 | Vangeel | G05B 15/02 717/173 |
| 2016/0338170 | A1 * | 11/2016 | Lebel | H05B 47/19 |
| 2016/0366746 | A1 * | 12/2016 | van de Ven | F21V 29/74 |
| 2017/0105270 | A1 * | 4/2017 | Saes | H05B 45/20 |
| 2018/0043130 | A1 * | 2/2018 | Moore-Ede | A61M 21/02 |
| 2019/0116307 | A1 | 4/2019 | Pincenti et al. | |
| 2019/0297704 | A1 * | 9/2019 | van de Ven | F21V 5/04 |
| 2020/0057828 | A1 * | 2/2020 | Harrison | G06F 30/20 |
| 2020/0057911 | A1 * | 2/2020 | Harrison | G06T 19/20 |
| 2020/0058401 | A1 * | 2/2020 | Harrison | H05B 47/11 |
| 2020/0068686 | A1 * | 2/2020 | Harrison | G06N 20/00 |
| 2020/0068687 | A1 * | 2/2020 | Harrison | G06T 15/10 |
| 2020/0103102 | A1 * | 4/2020 | Harrison | G06F 30/20 |
| 2020/0162158 | A1 * | 5/2020 | Tran | F24F 11/46 |
| 2020/0187336 | A1 * | 6/2020 | Verberkt | G05B 15/02 |
| 2020/0245435 | A1 * | 7/2020 | Meerbeek | H05B 47/105 |
| 2020/0267810 | A1 * | 8/2020 | Chemel | H05B 47/19 |
| 2020/0314980 | A1 * | 10/2020 | Van De Sluis | H05B 47/196 |
| 2021/0090151 | A1 * | 3/2021 | Bergman | H05B 47/19 |
| 2021/0160975 | A1 * | 5/2021 | Cremer | F21S 10/02 |
| 2021/0212187 | A1 * | 7/2021 | Meerbeek | H05B 47/19 |
| 2021/0336860 | A1 * | 10/2021 | Van Gheluwe | G06F 3/0484 |
| 2021/0352787 | A1 * | 11/2021 | Cremer | H05B 47/105 |
| 2021/0399915 | A1 * | 12/2021 | Van De Sluis | H05B 47/105 |
| 2021/0400781 | A1 * | 12/2021 | van de Ven | F21K 9/238 |
| 2022/0264732 | A1 * | 8/2022 | Meerbeek | H05B 47/17 |
| 2022/0343627 | A1 * | 10/2022 | Harrison | G06T 19/006 |
| 2022/0377869 | A1 * | 11/2022 | Rozendaal | H05B 47/19 |
| 2022/0398826 | A1 * | 12/2022 | Harrison | G06T 19/20 |
| 2022/0413125 | A1 * | 12/2022 | Aliakseyeu | G01S 13/04 |
| 2022/0418064 | A1 * | 12/2022 | Cremer | H05B 47/105 |
| 2023/0007753 | A1 * | 1/2023 | Aliakseyeu | H05B 47/115 |
| 2023/0011422 | A1 * | 1/2023 | Harrison | G06T 7/90 |
| 2023/0020737 | A1 * | 1/2023 | Harrison | G06F 3/011 |
| 2023/0122476 | A1 * | 4/2023 | Lang | A61N 5/0613 607/94 |
| 2023/0380041 | A1 * | 11/2023 | Borra | G06F 3/165 |
| 2024/0005593 | A1 * | 1/2024 | Yu | G06T 19/20 |
| 2024/0080953 | A1 * | 3/2024 | Broekman | H05B 47/1985 |
| 2024/0107649 | A1 * | 3/2024 | Krajnc | H05B 47/17 |
| 2024/0163998 | A1 * | 5/2024 | Baker | G06F 3/04817 |
| 2024/0324088 | A1 * | 9/2024 | Mouilleseaux | G06F 3/011 |
| 2025/0106966 | A1 * | 3/2025 | Ostojic | H05B 47/12 |
| 2025/0358917 | A1 * | 11/2025 | Maes | H05B 47/105 |

* cited by examiner

CONTROLLER FOR CONTROLLING A PLURALITY OF LIGHTING UNITS IN A SPACE AND A METHOD THEREOF

CROSS-REFERENCE TO PRIOR APPLICATIONS

This application is the U.S. National Phase application under 35 U.S.C. § 371 of International Application No. PCT/EP2023/063783, filed on May 23, 2023, which claims the benefit of European Patent application Ser. No. 22/177,123.1, filed on Jun. 3, 2022. These applications are hereby incorporated by reference herein.

FIELD OF THE INVENTION

The invention relates to a method of controlling a plurality of lighting units in a space, and to a computer program product for executing the method. The invention further relates to a controller for controlling a plurality of lighting units in a space.

BACKGROUND

Home environments typically contain multiple controllable lighting units for creation of atmosphere, accent or task lighting. These controllable lighting units may be controlled via a user interface of a control device, such as a smartphone, via a wireless network. A user may select a light scene via the user interface of the control device, whereupon the lighting units are controlled according to light settings defined by the light scene. Alternatively, the light scene may be activated automatically (e.g. based on a scheduled routine, based on a sensor that has been triggered, etc.) or the lighting units may be controlled according to light settings that are based on media content (e.g. an image, video, music, etc.).

The light settings of a light scene are to be mapped onto the lighting units. This mapping may be done by a user, for example via a user interface that enables the user to select light settings for certain lighting units and store the selected settings as the light scene. Alternatively, the mapping may be performed automatically and may, for example, be random or be based on the light rendering properties or types of the lighting units.

US 2020/0245435 A1 discloses a method of controlling a plurality of lighting devices is disclosed. The method comprises obtaining a 360 degree panoramic image, rendering the 360 degree panoramic image at least partially on an image rendering device, obtaining positions of the plurality of lighting devices relative to the image rendering device, mapping the 360 degree panoramic image onto the plurality of lighting devices based on the positions of the plurality of lighting devices, such that each lighting device is associated with a part of the 360 degree panoramic image, determining, for each lighting device, a light setting based on an image characteristic of the part of the 360 degree image, and controlling each lighting device according to the respective light setting.

SUMMARY OF THE INVENTION

A camera may be added to a lighting system, for instance for people monitoring, presence detection, security, etc. The inventors have realized that certain mappings of light settings onto lighting units may have a negative impact on the quality of images captured by a camera that is installed in the same space as the lighting system. For instance, a user may have created a light scene in his or her living room (or the light scene may have been generated automatically), and the light scene may have been created such that lighting units in the field of view of the camera are, for example, (heavily) saturated, too bright or (heavily) dimmed, which may negatively affect the quality of the images captured by the camera. Consequently the images may for example be colored, overexposed or underexposed. It is therefore an object of the present invention to provide a method and a controller for mapping light settings to lamps to improve the quality of images captured by a camera.

According to a first aspect, the object is achieved by a method of controlling a plurality of lighting units located in a space according to a light scene comprising a plurality of light settings, the method comprising:

- obtaining location information indicative of a location of a camera (located in the space) relative to the plurality of lighting units,
- mapping the plurality of light settings onto the plurality of lighting units, wherein each light setting is mapped onto a lighting unit based on the light setting's respective color, saturation, intensity and/or temporal aspects and based on the location of the camera relative to the respective lighting unit, and
- controlling the plurality of lighting units according to the mapped light settings.

The light settings are defined by the light scene, which light scene is applied to the plurality of lighting units. The light scene may be a predefined light scene, which may for instance be activated based on a user input, based on a sensor input, based on a schedule lighting control routine, etc. The mapping of the light settings onto the plurality of lighting units is based the locations of the lighting units relative to the camera and based on the color, saturation, intensity and/or temporal aspects of the light settings. The mapping may be based on image quality requirements of images captured by the camera. Each light setting may be associated with an image influence value indicating how the light setting influences (the quality of) images captured by the camera at the respective location. The light settings may be mapped onto the lighting units based on the respective image influence value such that when the lighting units are controlled according to the light settings, the quality of the images is improved or optimized. If, for example, a user would select a light scene comprising the plurality of light settings (e.g. three light settings for three lighting units), the light settings would be mapped onto the lighting units based on the locations of the lamps relative to the camera, and based on the influence of the respective light spectra of the respective light settings on the images captured by the camera. Advantageously, the quality of images captured by the camera are improved.

The method may further comprise: determining locations of the plurality of lighting units relative to a field of view of the camera based on the location information, and the mapping may be determined based on respective locations of the plurality of lighting units relative to the field of view of the camera. For instance, the location information may comprise the location (and, optionally, the orientation) of the camera relative to the space, and the field of view of the camera may be based on the location (and, optionally, the orientation) of the camera relative to the space. Additionally or alternatively, the location information may be extracted from one or more images captured by the camera, and the field of view of the camera may be determined based on the one or more images captured by the camera.

The method may further comprise: determining distances between the camera and the plurality of lighting units based on the location information, and the mapping may be further based on the distances between the camera and the plurality of lighting units. The mapping may, for example, be performed such that one or more light settings of which the light spectrum positively affects the quality of one or more images captured by the camera are mapped onto one or more first lighting units of which the light effect is in closer proximity to the camera compared to one or more second lighting units. The light emission of the lighting units in closer proximity of the camera may have a larger influence on the camera images. Taking the distance between the camera and the lighting units (and/or their light effects) into account is beneficial, because it further improves the quality of the images captured by the camera.

The location of the camera may be predefined or user-defined. The predefined location (and, optionally, the orientation of the camera) may, for example, have been defined by a user. The user may have provided information about a predefined/frequently used location (and/or orientation) of the camera on a map of the space. In another example, the predefined/frequently used location may be derived from the map of the space (e.g. form a building information model, a user-created map, etc.). Alternatively, the location (and the orientation) of the camera may be obtained by detecting a current location (and orientation) of the camera. The system may also monitor the location and/or orientation of the camera over time, and determine a typical or frequent location and/or orientation of the camera based on the monitoring. The location and/or the orientation may, for example, be detected by an (indoor) positioning system, for instance based on signal characteristics of signals transmitted between one or more of the lighting units and the camera. Additionally, the method may further comprise: repeatedly detecting the current location and/or orientation of the camera, and remapping the plurality of light settings onto the plurality of lighting units if a difference between a new location and/or orientation of the camera and a previous location and/or orientation of the camera exceeds a threshold. Hence, the mapping only changes if the camera is moved towards a substantially different location or is orientated in a substantially different direction. This is beneficial, because the (re)mapping does not need to be performed constantly.

The method may comprise: obtaining an original mapping of the light settings onto the plurality of lighting units. The step of mapping the plurality of light settings onto the plurality of lighting units may comprise: adjusting the original mapping of the light settings onto the plurality of lighting units based on the light setting's respective color, saturation, intensity and/or temporal aspects and based on the lighting unit's respective location relative to the location of the camera. The original mapping may, for example, be a predefined or user-defined mapping of the light settings onto the lighting units. When the camera is added to (or activated in) the lighting system, the original mapping may be adjusted, for instance based on camera requirements.

The method may further comprise: determining a current mode of operation of the camera, and controlling the plurality of lighting units according to the original mapping or according to the adjusted mapping in dependence on the current mode of operation of the camera. If, for example, the camera is switched off, the plurality of lighting units may be controlled according to the original mapping, and if the camera is switched on, the plurality of lighting units may be controlled according to the adjusted mapping.

The method may comprise: determining a current mode of operation of the camera, and determining the mapping further based on the current mode of operation of the camera. Different camera modes may require different illumination of the space. For instance, if the camera is set to a first mode for capturing a video of a social gathering, the quality requirements of the images may be higher compared to a second mode for intruder/presence detection, because for presence detection the image quality requirements may be less.

The method may further comprise: receiving activity information indicative of an activity of a user, and wherein the mapping is further based on the activity of the user. The activity may be a current activity or an upcoming (predicted) activity. The upcoming activity may be predefined and the activity information may for example be obtained from a user schedule or a calendar, the upcoming activity may be determined based on historical activities of the user, etc. The image quality requirements of the images captured by the camera may be different for different activities, and the mapping may be determined based thereon.

The method may further comprise: obtaining light rendering properties of the plurality of lighting units, and the mapping may be further based on the light rendering properties of the plurality of lighting units. For instance, a colored light setting may be mapped onto a lighting unit configured to emit colored light and a white light setting may be mapped onto a lighting unit configured to emit white light.

The step of obtaining the location information indicative of the location of the camera relative to the plurality of lighting units may comprise: obtaining one or more images captured by the camera, analyzing the one or more images to extract the locations of the plurality of lighting units relative to the camera. One or more images may thus be used to determine the locations of the lighting units relative to the camera. The lighting units may be recognized in the field of view based on their light output (e.g. based on their color, intensity, based on a modulation of the light emission, etc.), or a dark-room calibration may be executed, wherein one or more lighting units are sequentially switched on/off to determine their locations within the field of view of the camera.

Additionally or alternatively, step of obtaining the location information indicative of the location of the camera relative to the plurality of lighting units may comprise: obtaining first location information indicative of the locations of the plurality of lighting units relative to the space, obtaining second location information indicative of the location of the camera relative to the space, and determining the location of the camera in the space relative to the plurality of lighting units based on the first and second location information. The first and second location information may, for example, be received from an (indoor) positioning system.

The method may further comprise: obtaining one or more images captured by the camera, analyzing the one or more images to extract one or more image quality parameters of the one or more images based on the analyzed one or more images, and adjusting the mapping of the plurality of light settings onto the plurality of lighting units based on the one or more image quality parameters of the one or more images. These steps may be repeated for different mappings. A mapping which provides a target image quality of the one or more images may be selected. Such an iterative loop is beneficial, because it can be used to select a mapping which provides a target quality of images captured by the camera.

The steps may be iteratively repeated until the target quality of images captured by the camera is reached.

According to a second aspect, the object is achieved by a computer program product for a computing device, the computer program product comprising computer program code to perform any of the above-mentioned methods when the computer program product is run on a processing unit of the computing device.

According to a third aspect, the object is achieved by a controller for controlling a plurality of lighting units located in a space according to a light scene comprising a plurality of light settings, the controller comprising a processor configured to obtain location information indicative of a location of a camera in the space relative to the plurality of lighting units, map the plurality of light settings onto the plurality of lighting units, wherein each light setting is mapped onto a lighting unit based on the light setting's respective color, saturation, intensity and/or temporal aspects and based on the lighting unit's respective location relative to the location of the camera, and control the plurality of lighting units according to the mapped light settings.

According to a fourth aspect, the object is achieved by a lighting system comprising: a plurality of lighting units and a communication unit configured to communicate lighting control commands to the plurality of lighting units, and the controller configured to control the plurality of lighting units according to the mapped light settings by communicating the lighting control commands to the plurality of lighting units via the communication unit.

It should be understood that the computer program product, the controller and the lighting system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
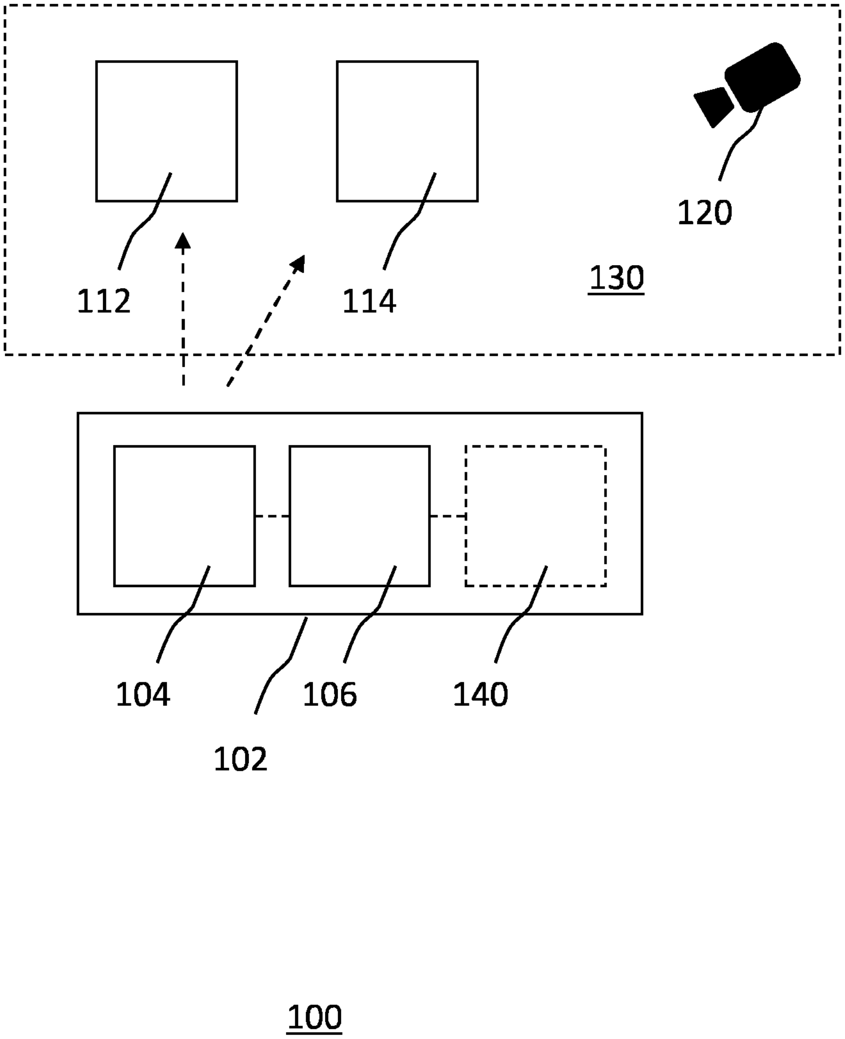
FIG. 1 shows schematically an example of a lighting system comprising a controller for controlling a plurality of lighting units.

FIG. 1 shows schematically an example of a lighting system 100 comprising a controller 102 for controlling a plurality of lighting units 112, 114 in a space 130. The controller 102 comprises a processor (e.g. a microcontroller, circuitry, a microchip, etc.) configured to obtain location information indicative of a location of a camera 120 (located in the space 130) relative to the plurality of lighting units 112, 114, map the plurality of light settings onto the plurality of lighting units 112, 114, wherein each light setting is mapped onto a respective lighting unit based on the light setting's respective color, saturation, intensity and/or temporal aspects and based on the location of the camera 120 relative to the respective lighting unit, and control the plurality of lighting units 112, 114 according to the mapped light settings.

The lighting units 112, 114 comprise one or more (LED) light sources. The lighting units 112, 114 may be light bulbs, light strips, TLEDs, light tiles, etc. The lighting units 112, 114 may be individually controllable light sources of a luminaire (e.g. an LED strip). The lighting units 112, 114 may comprise a control unit, such as a microcontroller (not shown), for controlling the light output generated by the one or more light sources based on received lighting control commands (which may be based on the generated light settings/light scene, which may be received from the controller 102). A lighting control command may comprise lighting control instructions for controlling the light output, such as the color, intensity, saturation, beam size, beam shape, etc. of the one or more light sources.

The controller 102 may be comprised in any type of lighting control device. The controller 102 may, for example, be comprised in a mobile device (e.g. a smartphone, a wearable device, a (tablet) pc, etc.), in a central lighting controller (e.g. a bridge, a router, a central home controller, a smart voice assistant, etc.), a remote server connected to the lighting units 112, 114 via a network/the internet, etc. The controller 102 may be configured to control the lighting units 112, 114. The controller 102 may comprise a communication unit 104 configured to communicate lighting control commands via any wired or wireless communication protocol (e.g. Ethernet, DALI, Bluetooth, Wi-Fi, Li-Fi, Thread, ZigBee, etc.) to the lighting units 112, 114, either directly or indirectly.

The processor 106 is configured to control the plurality of lighting units 112, 114 according to the light scene. The light scene is defined as a plurality of predefined light settings for the plurality of lighting units 112, 114. The light settings may be mapped onto the plurality of lighting units 112, 114 according to an original (predefined) mapping. A user may, for example, select a light scene (which may be indicative of the plurality of light settings for the plurality of lighting units 112, 114) via a user interface (e.g. by providing a voice command to activate the light scene, by selecting the light scene via a touch-sensitive display, by selecting the light scene via a light switch, etc.). Alternatively, the light scene may be activated when a sensor (e.g. a presence sensor, a light sensor, etc.) has been triggered. Alternatively, the light scene may be activated based on a lighting control routine or a scheduled light scene, which may be activated based on the time of day. The processor 106 may be further configured to receive an input indicative of an activation of the light scene, and map the plurality of light settings onto the plurality of lighting units 112, 114 (based on the light settings' colors, saturation and/or intensity and based on the lighting units' respective locations relative to the location (and orientation) of the camera 120) when the light scene is activated.

The plurality of light settings of the light scene may be based on colors of one or more images, and the input may be indicative of a selection of an image. The image may, for example, be selected by a user via a user interface of a mobile device such as a smartphone. The colors may be extracted from the one or more images or be associated with the one or more images. The colors may be extracted from the image by analyzing color values of pixels or groups of pixels of the image. The extracted colors may, for example, be dominant colors from the image. Techniques for extracting colors from images are known in the art and will therefore not be discussed in detail.

The processor 106 is configured to obtain location information indicative of a location of the camera 120 in the space 120 relative to the plurality of lighting units 112, 114. The controller 102 may comprise an input for obtaining the location information. The input may be the communication unit 104, which may be configured to obtain the location information indicative of the location of the camera 120 in the space relative to the plurality of lighting units 112, 114. Additionally or alternatively, the input may be an input to the processor, and the processor 106 may obtain the location information from a memory 140, which may be comprised in the controller 102. Alternatively, the location information may be obtained (e.g. by the processor 106) by extracting the location information from one or more images captured by the camera 120.

Figure 3:
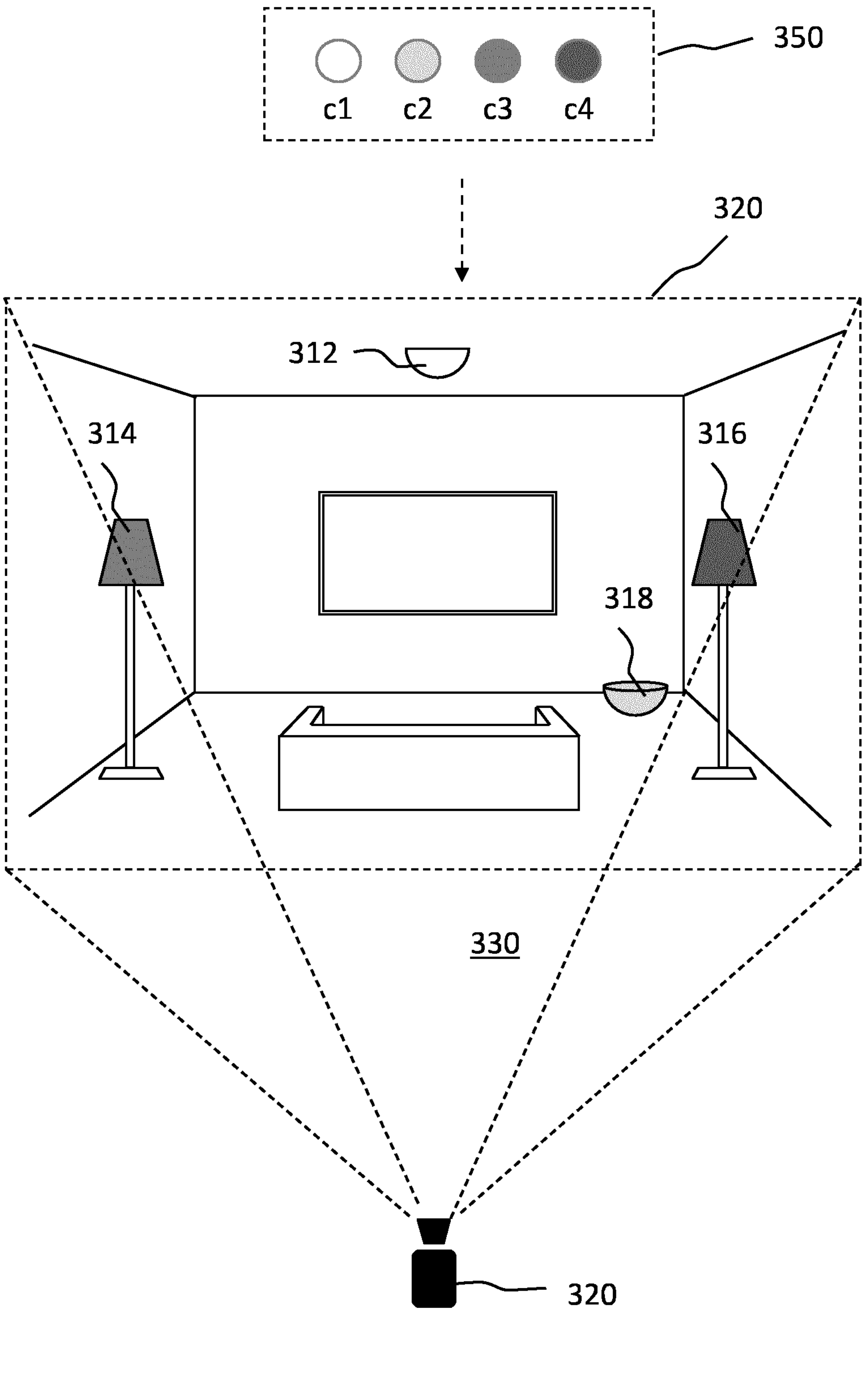
FIG. 3 shows schematically an example of a field of view of a camera of a space.

The processor 106 may, for example, be configured to obtain one or more images captured by the camera 120 and analyze the one or more images to extract the locations of the plurality of lighting units relative to the camera 120. One or more images may thus be used to determine the locations of the lighting units relative to the camera 120. The lighting units may be recognized in the field of view based on their light output (e.g. based on their color, intensity, based on a modulation of the light emission, etc.), or a dark-room calibration may be executed, wherein one or more lighting units are sequentially switched on/off to determine their locations within the field of view of the camera. The distance between the camera 120 and the lighting units 112, 114 may be further determined based on the analysis of the image. Additionally, the camera may be a depth camera configured to provide depth information to the processor 106 to determine the distances between the camera 120 and the lighting units. Techniques for determining the location of a lighting unit relative to a field of view of a camera are known in the art and will therefore not be discussed in further detail. FIG. 3 illustrates an example wherein a camera 330 has been installed in a space 330. The processor 106 may receive one or more images form the camera 320 and analyze these to detect the locations of the lighting units 312-318 in the environment relative to the camera 320.

Additionally or alternatively, the processor 106 may be configured to obtain first location information indicative of the locations of the plurality of lighting units 112, 114 relative to the space 130 and to obtain second location information indicative of the location of the camera 120 relative to the space 130, and determine the location of the camera 120 in the space 120 relative to the plurality of lighting units 112, 114 based on the first and second location information. The first and second location information may, for example, be received from an (indoor) positioning system (such as an RF-based indoor positioning system or a visible light communication (VLC) based positioning system), it may be based on the signal strength of signals transmitted between one or more lighting units and the camera (e.g. a smartphone). The first and second location information may be indicative of coordinates of the lighting units and the camera relative to the space. Additionally, the location information may be indicative of the orientation of the camera 120 relative to the space 130. The orientation may for example be based on data from an orientation sensor comprised in the camera 120, based on a predetermined orientation of the camera (e.g. defined by a user via a user interface), etc. Such techniques of obtaining location and/or orientation information are known in the art and will therefore not be discussed in further detail.

The processor 106 may be further configured to obtain information indicative of the field of view 240 of the camera 120, 220. The processor 106 may be configured to obtain information of the field of view (the angle of view) of the camera based on the type of camera. The processor 106 may be further configured to determine the locations of the plurality of lighting units 112, 114 with respect to the field of view 240 of the camera 120, 220. The processor 106 may be further configured to determine the mapping further based on the locations of the plurality of lighting units 112, 114 with respect to the field of view 240 of the camera 120, 220.

Figure 2:
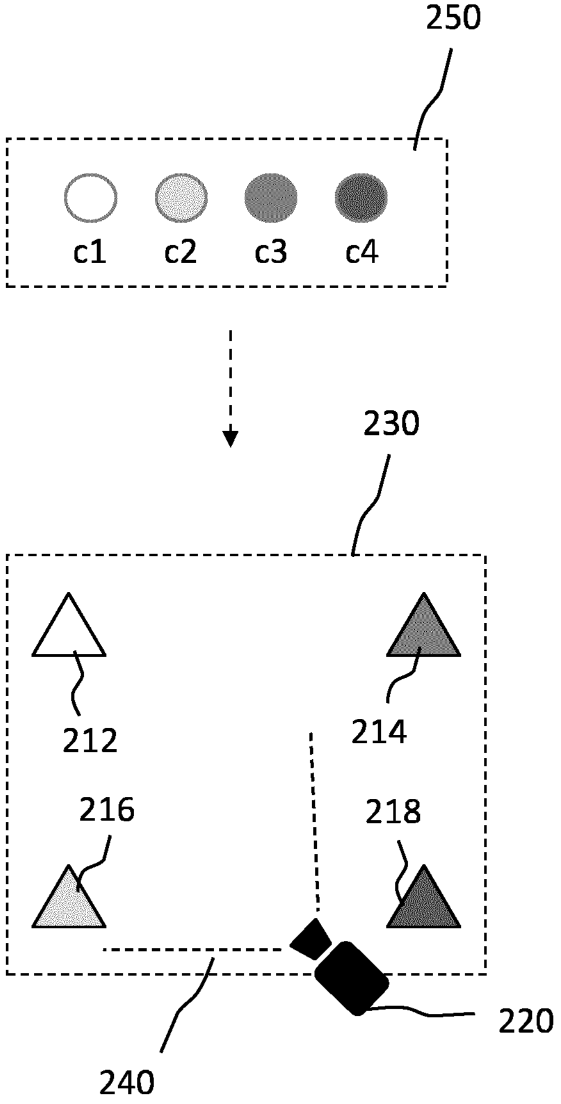
FIG. 2 shows schematically an example of a lighting system comprising a plurality of lighting units in a space that are controlled based on their location relative to a camera.

The processor 106 is further configured to map the plurality of light settings onto the plurality of lighting units 112, 114, wherein each light setting is mapped onto a respective lighting unit based on the light setting's respective color, saturation, intensity and/or temporal aspects and based on the lighting unit's respective location relative to the location (and, optionally, orientation) of the camera 120. FIG. 2 illustrates an example of a mapping of a light scene 250 onto a plurality of lighting units 212, 214, 216, 218. The processor 106 may receive light scene information of the light scene 250 comprising a plurality of light settings c1, c2, c3, c4 that are to be mapped onto a plurality of lighting units 212, 214, 216, 218. The light settings may have been mapped onto the lighting units 212, 214, 216, 218 according to an original mapping (e.g. c1 to lighting unit 218, c2 to lighting unit 216, c3 to lighting unit 214 and c4 to lighting unit 212). This original mapping may not be optimized for the camera image, and the processor 106 may therefore determine a new mapping to improve the quality of the camera image. The processor 106 may further receive location information indicative of the locations of the plurality of lighting units 212, 214, 216, 218 relative to a location and/or an orientation of a camera 220 in the space 230, for instance from an (indoor) positioning system. The camera location may be a predefined location relative to the space 230. The processor 106 may further receive the color, saturation, intensity and/or temporal aspects of the light settings. In this example, the light settings may be a white light setting (c1), a desaturated blue light setting (c2), a blue light setting (c3) and a purple light setting (c4). The processor 106 may determine the mapping of the plurality of light settings c1, c2, c3, c4 onto the plurality of lighting units 212, 214, 216, 218 based on their location and color, saturation, intensity and/or temporal aspects, resulting in that light setting c1 may be mapped to a lighting unit in front of the camera (i.e. on lighting unit 212), that light setting c2 may be mapped to a lighting unit in the peripheral view of the camera (i.e. on lighting unit 216) and that that light settings c3 and c4 may be mapped to lighting units outside the field of view of the camera (i.e. on lighting units 214, 218).

FIG. 3 shows another example of a mapping of a light scene 350 onto a plurality of lighting units 212, 214, 216, 218. The processor 106 may receive light scene information of the light scene 350 comprising a plurality of light settings c1, c2, c3, c4 that are to be mapped onto a plurality of lighting units 312, 314, 316, 318. The light settings may have been mapped onto the lighting units 312, 314, 316, 318 according to an original mapping (e.g. c1 to lighting unit 318, c2 to lighting unit 316, c3 to lighting unit 314 and c4 to lighting unit 312). This original mapping may not be optimized for the camera image, and the processor 106 may therefore determine a new mapping to improve the quality of the camera image. The processor 106 may further receive location information indicative of the locations of the plurality of lighting units 312, 314, 316, 318 relative to a location and/or an orientation of a camera 320 in the space 330. In this example, the camera 330 may capture an image of the space 330, and the locations of the lighting unis 312, 314, 316, 318 relative to the camera 330 may be determined by analyzing the image, for instance by the processor 106. The processor 106 may further receive the color, saturation, intensity and/or temporal aspects of the light settings. In this example, the light settings may be a white light setting (c1), a desaturated red light setting (c2), a red light setting (c3) and a blue light setting (c4). The processor 106 may determine the mapping of the plurality of light settings c1, c2, c3, c4 onto the plurality of lighting units 312, 314, 316, 318 based on their location and color, saturation, intensity and/or temporal aspects, resulting in that light setting c1 may be mapped to a lighting unit in front of the camera (i.e. on lighting unit 312), that light setting c2 may be mapped to a lighting unit in the less central in the field of view of the camera (i.e. on lighting unit 318) and that that light settings c3 and c4 may be mapped to lighting units in the periphery of the field of view of the camera (i.e. on lighting units 314, 316).

In another example, the processor 106 may be configured to map light settings onto a respective lighting units based on the light setting's temporal aspects and based on the lighting unit's respective location relative to the location (and, optionally, orientation) of the camera 120. The temporal aspects may be defined as the changes of the light setting over time. In other words, the light settings may be dynamic light settings that change over time. The processor 106 may be configured to determine the mapping based on a dynamicity level of the light settings, wherein the dynamicity level is indicative of a number of changes (e.g. of the color and/or intensity) of a respective light setting over time and/or a level of contrast of the changes (e.g. of the color and/or intensity) of a respective light setting over time. For example, a first light setting with a first (low) dynamicity level (e.g. a first (low) number of changes and/or a second (low) contrast of changes of the light setting) may be mapped onto a lighting device located in the center of the field of view of the camera 120, and a second light setting with a second (higher) dynamicity level (e.g. a second (low) number of changes and/or a second (higher) contrast of changes of the light setting) may be mapped onto a lighting device located in the periphery of the field of view of the camera 120.

The processor 106 is further configured to control the plurality of lighting units 112, 114 according to the mapped light settings (as shown in FIGS. 2 and 3). The controller 102 may comprise the communication unit 104 configured to communicate lighting control commands indicative of the light settings to the plurality of lighting units.

The processor 106 may be configured to determine the (re)mapping based on image quality requirements of images captured by the camera. Each light setting may be associated with an image influence value indicating how the light setting influences (the quality of) images captured by the camera at the respective location. The image influence values may be indicative of the influence respective light spectra of the respective light settings have on the images captured by the camera 120. These associations may be stored in a look-up table (e.g. in memory 140 or in a remote memory), which may be accessible by the processor 106. The light settings may be mapped onto the lighting units based on the respective image influence value such that when the lighting units are controlled according to the light settings, the quality of the images is improved or optimized. If, for example, a user would select a light scene comprising the plurality of light settings (e.g. four light settings for four lighting units, as illustrated in FIGS. 2 and 3), the light settings would be mapped onto the lighting units based on the locations of the lighting units relative to the camera 120 and based on the image influence values.

The processor 106 may be configured to obtain an original mapping of the light settings of the light scene onto the plurality of lighting units 112, 114 (e.g. a user-defined mapping, a system-defined mapping, etc.). The processor 106 may be further configured to adjust the original mapping of the light settings onto the plurality of lighting units 112, 114 by remapping the light scene onto the plurality of lighting units 112, 114 based on the light setting's respective color, saturation, intensity and/or temporal aspects and based on the lighting unit's 112, 114 respective location relative to the location of the camera 120. The processor 106 may be further configured to determine a current mode of operation of the camera 120, and control the plurality of lighting units according to the original mapping or according to the adjusted mapping in dependence on the mode of operation of the camera. The processor 106 may be configured to receive an input signal indicative of the current mode of operation of the camera 120 (e.g. from the camera 120, from a central (home) control system, form a software application, etc.). Different modes of operation may require different illumination, and the mapping of the light scene may therefore be determined based on the current mode of operation. For instance, if the camera is switched off, the plurality of lighting units may be controlled according to the original mapping, because no dedicated illumination of the space if required. If the camera is switched on, the plurality of lighting units may be controlled according to the adjusted mapping.

The processor 106 may be further configured to determine distances between the camera 120 and the plurality of lighting units 112, 114 based on the location information. The processor 106 may be further configured to determine the mapping further based on the distances between the camera 120 and the plurality of lighting units 112, 114. The camera 120 may for example be a depth camera configured to provide depth information to the processor 106 to determine the distances between the camera 120 and the lighting units 112, 114. Alternatively, the distances may be determined based on the locations of the lighting units 112, 114 relative to the camera 120 and/or the space 130. If, for example, a first lighting unit is in closer proximity to the camera compared to a second lighting unit, a first light setting (e.g. a first light setting with a first (low) saturation and/or a first (low) brightness) may be mapped onto the first lighting unit 112 based the lighting unit's distance to the camera, and a second light setting (e.g. a second light setting with a higher saturation and/or brightness than the first light setting) may be mapped onto the second lighting unit 114 based on the second lighting unit's distance to the camera.

The processor 106 may be further configured to determine the mapping of the light settings onto the plurality of lighting units 112, 114 based on the current mode of operation of the camera 120. The processor 106 may be configured to determine the current mode of operation of the camera, for instance based on an input signal indicative of the current mode of operation. The input signal may for example be received from the camera 120, from a central (home) control system, form a software application, etc. For instance, if the camera is set to a first mode for capturing a video of a social gathering, the quality requirements of the images may be higher compared to a second mode for intruder/presence detection, because for presence detection the image quality requirements may be less. In another example, the first mode of operation may be an "at home" mode, and the second mode of operation may be an "away from home" mode. Here, the image quality requirements may be less for the first mode of operation compared to the second mode of operation. In another example the first mode of operation may be a video/image recording mode to capture a video/image of a person, and the second mode of operation may be a non-recording mode (e.g. a presence detection mode). Here, the image quality requirements may be higher for the first mode of operation compared to the second mode of operation.

The processor 106 may be further configured to obtain activity information indicative of an activity of the user, and to determine the mapping further based on the activity of the user. The activity information may be received via the communication unit 104 from an external source (e.g. a central (home) control system, an activity detection system, etc.), or the activity information may for example be obtained from the memory 140 (e.g. from a user schedule, a calendar, etc.). If, for example, a user is watching a movie, light settings of which the spectrum would negatively affect the quality of camera images could be mapped onto lighting units in close proximity and/or in the field of view of the camera because the quality of the camera images would not be important, whereas if a user is sleeping, light settings of which the spectrum would positively affect the quality of camera images may be mapped onto lighting units in close proximity and/or in the field of view of the camera. The activity may be a current or future activity. The upcoming activity may have been determined/learnt based on detected historical activities of the user.

The processor 106 may be further configured to obtain activity information indicative of an upcoming activity of the user, and to determine the mapping further based on the upcoming activity of the user. The upcoming activity may be predefined and the activity information may for example be obtained from a memory 140 storing a user schedule or a calendar. The upcoming activity may have been determined/learnt based on detected historical activities of the user. If, for example, the activity information is indicative of that the user will go to bed, the light settings of which the light would stimulate the melatonin production of the user may be mapped onto lighting units in close proximity and/or in the field of view of the user, whereas if the information is indicative of that the user will study, light settings of which the light would suppress the melatonin production of the user may be mapped onto lighting units in close proximity and/or in the field of view of the user.

The processor 106 may be further configured to obtain light rendering properties of the plurality of lighting units 112, 114, and the mapping may be further based on the light rendering properties of the plurality of lighting units 112, 114. For instance, a colored light setting may be mapped onto a lighting unit configured to emit colored light and a white light setting may be mapped onto a lighting unit configured to emit white light.

The processor 106 may be further configured to obtain one or more images captured by the camera 120 and to analyze the one or more images to extract one or more image quality parameters of the one or more images based on the analyzed one or more images. The processor 106 may be further configured to adjust the mapping of the plurality of light settings onto the plurality of lighting units based on the one or more image quality parameters of the one or more images. The processor 106 may be configured to iteratively repeat these steps until a target image quality of the one or more images is achieved. If, for example, the one or more images are (partially) overexposed due to light emitted by to a lighting unit onto which a bright light setting has been mapped, the processor 106 may adjust the mapping such that a different (e.g. a less bright) light setting is mapped onto that lighting unit. If, for example, the one or more images are (partially) underexposed, the processor 106 may adjust the mapping such that a different (e.g. a brighter) light setting is mapped onto a lighting unit in the field of view of the camera 120. If, for example, the one or more images are colored due to a colored light setting mapped onto a lighting unit, the processor 106 may adjust the mapping such that a different (e.g. desaturated or different colored) light setting is mapped onto that lighting unit.

Figure 4:
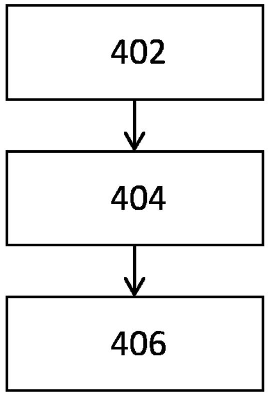
FIG. 4 shows schematically a method of controlling a plurality of lighting units located in a space according to a light scene.

FIG. 4 shows schematically a method 400 of controlling a plurality of lighting units 112, 114 located in a space according to a light scene comprising a plurality of light settings. The method 400 comprises: obtaining 402 location information indicative of a location of a camera (located in the space) relative to the plurality of lighting units 112, 114, mapping 404 the plurality of light settings onto the plurality of lighting units 112, 114, wherein each light setting is mapped onto a lighting unit based on the light setting's respective color, saturation, intensity and/or temporal aspects and based on the location of the camera relative to the respective lighting unit, and controlling 406 the plurality of lighting units 112, 114 according to the mapped light settings.

The method 400 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins).

Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a plurality of lighting units located in a space according to a light scene comprising a plurality of light settings, the method comprising:

obtaining location information indicative of a location of a camera relative to the plurality of lighting units, obtaining an original mapping of the plurality of light settings onto the plurality of lighting units, mapping the plurality of light settings onto the plurality of lighting units by adjusting the original mapping of the plurality of light settings onto the plurality of lighting units, wherein each light setting is mapped onto a lighting unit based on the light setting's respective color, saturation, intensity and/or temporal aspects and based on the location of the camera relative to the respective lighting units, and controlling the plurality of lighting units according to the mapped light settings, wherein the method further comprises:

obtaining one or more images captured by the camera, analyzing the one or more images to extract one or more image quality parameters of the one or more images based on the analyzed one or more images, and adjusting the mapping of the plurality of light settings onto the plurality of lighting units based on the one or more image quality parameters of the one or more images.

2. The method of claim 1, wherein the method comprises:

determining locations of the plurality of lighting units relative to a field of view of the camera based on the location information, wherein the mapping is further determined based on respective locations of the plurality of lighting units relative to the field of view of the camera.

3. The method of claim 1, wherein the method further comprises:

determining distances between the camera and the plurality of lighting units based on the location information, and wherein the mapping is further based on the distances between the camera and the plurality of lighting units.

4. The method of claim 1, wherein the location of the camera is predefined or user-defined, or wherein the location of the camera is obtained by detecting a current location of the camera.

5. The method of claim 1, wherein the method further comprises:

determining a current mode of operation of the camera, and controlling the plurality of lighting units according to the original mapping or according to the adjusted mapping in dependence on the current mode of operation of the camera.

6. The method of claim 1, wherein the method further comprises:

determining a current mode of operation of the camera, and determining the mapping further based on the current mode of operation of the camera.

7. The method of claim 1, further comprising:

receiving activity information indicative of an activity of a user, and wherein the mapping is further based on the activity of the user.

8. The method of claim 1, further comprising:

obtaining light rendering properties of the plurality of lighting units, wherein the mapping is further based on the light rendering properties of the plurality of lighting unit.

9. The method of claim 1, wherein the step of obtaining the location information indicative of the location of the camera relative to the plurality of lighting units comprises: obtaining one or more images captured by the camera, analyzing the one or more images to extract the locations of the plurality of lighting units relative to the camera.

10. The method of claim 1, wherein the step of obtaining the location information indicative of the location of the camera relative to the plurality of lighting units comprises:

obtaining first location information indicative of the locations of the plurality of lighting units relative to the space, obtaining second location information indicative of the location of the camera relative to the space, and determining the location of the camera in the space relative to the plurality of lighting units based on the first and second location information.

11. A computer program product for a computing device, the computer program product comprising computer program code which, when the computer program product is run on the controller, causes the controller to carry out the method of claim 1.

12. A controller for controlling a plurality of lighting units located in a space according to a light scene comprising a plurality of light settings, the controller comprising a processor configured to obtain location information indicative of a location of a camera relative to the plurality of lighting units, obtain an original mapping of the plurality of light settings onto the plurality of lighting units, map the plurality of light settings onto the plurality of lighting units by adjusting the original mapping of the plurality of light settings onto the plurality of lighting units, wherein each light setting is mapped onto a lighting unit based on the light setting's respective color, saturation, intensity and/or temporal aspects and based on the location of the camera relative to the respective lighting units, and control the plurality of lighting units according to the mapped light settings, wherein the processor is further configured to:

obtain one or more images captured by the camera, analyze the one or more images to extract one or more image quality parameters of the one or more images based on the analyzed one or more images, and adjust the mapping of the plurality of light settings onto the plurality of lighting units based on the one or more image quality parameters of the one or more images.

13. A lighting system comprising:

a plurality of lighting units, a communication unit configured to communicate lighting control commands to the plurality of lighting units, and the controller of claim 12 configured to control the plurality of lighting units according to the mapped light settings by communicating the lighting control commands to the plurality of lighting units via the communication unit.

* * * * *